July 9, 1974 B. E. JAGID 3,823,040
BATTERY SEALING METHOD RECEPTIVE TO INJECTION FILLING
Filed Aug. 29, 1972

United States Patent Office 3,823,040
Patented July 9, 1974

3,823,040
BATTERY SEALING METHOD RECEPTIVE TO INJECTION FILLING
Bruce E. Jagid, Whitestone, N.Y., assignor to Power Conversion, Inc., Mount Vernon, N.Y.
Filed Aug. 29, 1972, Ser. No. 284,580
Int. Cl. H01m 1/02
U.S. Cl. 136—162
6 Claims

ABSTRACT OF THE DISCLOSURE

A non-aqueous hermetically sealed battery cell including an electrode assembly in an anhydrous liquid electrolyte under pressure is formed by necking a metal casing, closed at one end, a predetermined distance from the other end and seating upon said neck an assembly including a thrust ring, an insulating member, and a hermetic sealing member. The hermetic sealing member comprises an apertured seal support member, and an elastomeric septum, in compression, within the aperture. The open end is then uniformly upset or crimped to bear upon the insulating member and hermetic sealing member. A feature of the invention calls for a three part seal support member in the form of a sandwich surrounding the septum. The sandwiching elements contiguous the septum comprise a metal inert to the electrolyte; clad bonded to the external element is a conventional cold rolled steel battery end cap for providing a terminal of the conventional easily solderable type.

---

This invention relates generally to the hermetic sealing of battery cells and in particular to an arrangement for insuring against the introduction of the ambient environment and the release of battery electrolyte and gases before and after the application of needle filling techniques, respectively.

The art is replete with arrangements for hermetically sealing and simultaneously insulating the opposite terminals of a battery. Recent advances in the battery art, however, have led to significantly more stringent sealing requirements. These recent innovations include cells having high vapor pressure electrolytes such as ammonia and sulfur dioxide. Complications arise because of the subjection of such batteries to storage at temperatures anywhere between those naturally occuring in the Arctic and those at the Equator, thereby reducing and multiplying, respectively, included gas pressures. Further complications arise because of the corrosive nature of the electrolyte and the ever increasing requirement that filling be further expedited.

With respect to such cells even the most advanced of the conventional sealing arrangements has proved to be hermetically ineffective. One arrangement for overcoming the prior art deficiencies is shown and described in copending application Ser. No. 148,458 to the same assignee. In this arrangement, a non-aqueous hermetically sealed battery cell comprising an electrode assembly and an anhydrous liquid electrolyte is formed by necking a metal casing, closed at one end, a predetermined distance from the other end and seating upon said neck a assembly including a thrust ring, an insulating member, and a metal cap. The open end is then uniformly upset or crimped to bear upon said insulating member and cap, thereby hermetically sealing the assembly.

In the copending application, the battery is filled with the electrolyte through a nipple in the cap which is then cold welded. While the peripheral sealing arrangement shown there is applicable here and will be described with reference to the invention described herein, the cold welding of a nipple is not particularly appropriate for needle filling techniques.

Accordingly, it is the object of this invention to provide a highly reliable insulating and hermetic seal for use on cylindrical battery casings to prevent the escape of high vapor pressure gases such as ammonia and sulfur dioxide yet which permits expeditious needle filling techniques to be applied to the filling of such casings.

It is a further object of this invention to provide a seal for the aforementioned purpose which is inexpensive as to materials, relatively non-critical as to tolerance, and easily formed using mass production techniques.

Briefly, the invention is predicated upon the concept of forming a compressed septum through which the needle filling may take place, the septum being relatively impervious to the sealed electrolyte and restoring to its sealed condition upon needle retrograde. It is a feature of the invention that normal terminal materials may be employed as may the conventional battery terminal shape permitting use of the finished battery in the conventional fashion, in the endless variety of products in which it may be used.

The above mentioned and other features and objects of this invention and the manner of attaining them will become more apparent and the invention itself will best be understood by reference to the following description of three embodiments of the invention taken in conjunction with the accompanying drawings, the description of which follows, wherein.

Figure 1:
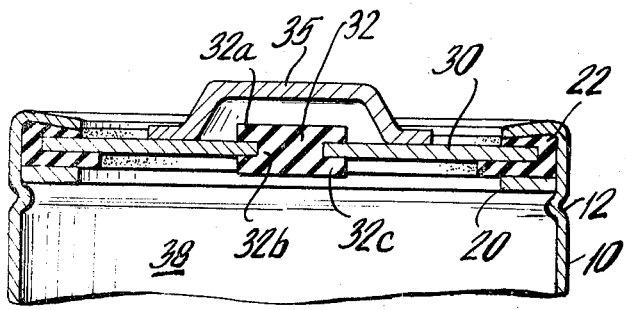
FIG. 1 is a sectional view of the battery end portion to which the invention is directed.

Turning now to FIG. 1, the positioned components may be seen in the finished state. The battery shell 10 comprises a cylindrical metal casing closed at one end in a conventional manner (not shown) and including a neck 12 formed a predetermined distance from the other end. The manner of the formation of the neck 12 is described in detail in the previously referred to copending application. Suffice to say, any necking technique which satisfies the objective of forming a neck 12 in the form shown is satisfactory, so long as the metal is not stressed beyond its yield point. Preferably the shell is a low carbon cold rolled steel.

A thrust ring 20 dimensioned to be slidably received in the open end of the shell casing rests upon the neck portion 12. The thrust ring is preferably metallic so that it is (a) light and strong, providing good thrust bearing surface; and (b) that it forms a good electrical contact where one electrode is passed between the neck and ring as taught in the said copending application.

As may be seen, the thrust ring 20 serves a platform for insulating-seal member 22 which peripherally surrounds an apertured seal support member 30. Casing 10 is deformed as described in the copending application to bear upon member 22 sufficiently to provide hermetic seal at the casing edge. Space 38 includes an electrode assembly of at least two opposite polarity electrodes (disposed in the conventional manner) and an electrolyte to be injected as described.

Member 22 also serves the function of electrically isolating the seal support member 30 from casing 12.

Septum 32 is compressibly embraced, as shown, within the seal support member aperture. The septum is an elastomer having a highly resilient properties for hermetically sealing upon needle passage.

Materials used for the septum should have a low vapor transmission rate with respect to the electrolyte materials and gases sealed therein and relatively low cold flow characteristics at elevated temperatures of for example $+160°$ F. Exemplary materials for an $SO_2$ type electrolyte are polypropylene, polyethylene, polysulfon, polyphenolene oxide.

It will be appreciated by those skilled in the art that the referred to figures are not drawn to scale and that accordingly the relative size of the septum vis-a-vis the seal support member will depend upon the material used, the needle diameter, and the amount of pressure anticipated within the casing.

Septum compression may be realized by any known conventional technique. For example, the septum may be slightly deformed to permit the neck section to enter an oversized apertured seal support member which is thereafter compressibly reduced to engage, compress, and retain the septum 32. Alternatively, the septum may have its upper lip 32a and the neck portion 32b inserted in a compressing tool which is withdrawn through the aperture, portion 32c acting as a flange to halt further progress through the aperture and permit the septum to be withdrawn from the compressing tool whereupon it will spring outwardly to lie in compression within the aperture. Terminal 35 is thereafter joined by spot welding, soldering, or any conventional technique which affords good electrical and mechanical joinder to form the positive terminal of the battery.

Figure 2:
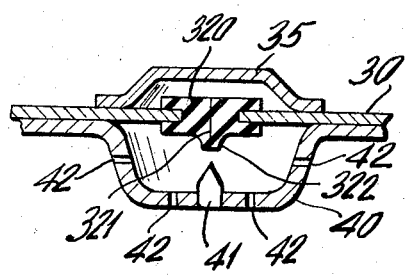
FIG. 2 illustrates, in section, an alternative arrangement in which a catheter is employed to puncture the needle and which utilizes the internal pressure to maintain the configuration of a preformed aperture.
Figure 2A:
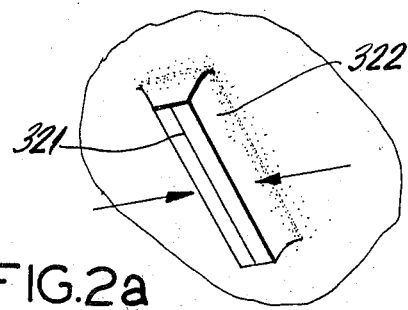
FIG. 2a is a detail of the mesa shape of the area immediately surrounding the aperture of FIG. 2.

FIG. 2 shows an alternative arrangement for permitting passage of a larger filling needle which is particularly applicable to reserve cells where the electrolyte is added in the field from, for example, a sealed container including a closed ended needle as an integral part. In this embodiment, septum 320 includes a slit 321 in the depending ridge portion 322, shown in greater detail in FIG. 2a. This arrangement permits the use of a sealed filling chamber (not shown) having a closed needle portion which penetrates the slit 321 and makes contact with a catheter 41, the latter of which is formed as a portion of a recessed member 40. The recessed member 40 includes apertures 42 for passage of gas into the cell upon slight withdrawal of the now punctured needle from the catheter 41. Complete withdrawal of the needle through the slit permits resealing which is effective by the side pressure imparted to the ridge in a direction of the arrows in FIG. 2a by the now internally pressurized cell. As before, top portion 35 forms the positive terminal of the completed battery. If necessary, a frangible disc (not shown) may overlay the septum for penetration first by the filling needle. The disc functions to avoid gas transfer prior to pressurized filling.

Figure 3:
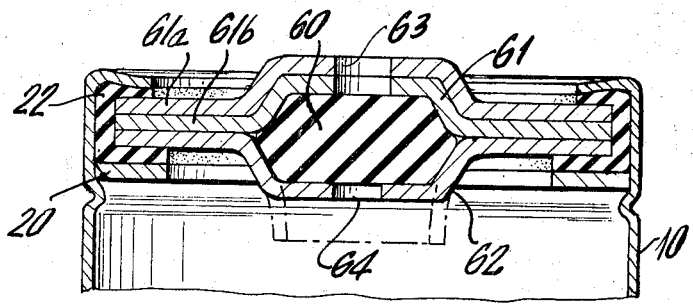
FIG. 3 illustrates, in section, the third embodiment of the invention in which the septum is sandwiched between recessed plates.

In FIG. 2 peripheral portions of the seal support member and recessed member 40 are omitted. It will be appreciated, however, that these may be similarly mechanically coupled to the casing as shown in FIGS. 1 or 3. It is to be clearly understood, however, that the mechanical bond between the seal support member and casing described herein, while it is that also shown in copending application Ser. No. 148,458, is only a preferred arrangement alluded to for purposes of completeness in discussing the invention. However, any alternative arrangement may also be employed at the seal support member periphery which fulfills the functional requisites of sealing hermetically and insulating electrically the support member from the casing.

Figure 3A:
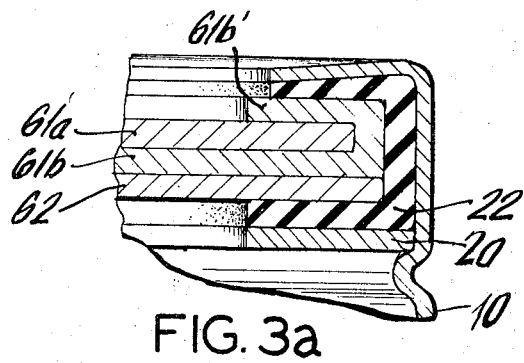
FIG. 3a illustrates an alternative embodiment for the sandwich periphery wherein the non-corrosive metal is folded back on itself.

In FIG. 3 a third embodiment of the invention is shown in which a septum 60 is compressed within an apertured sandwich composed of first and second partial seal support members 61 and 62. This type of support may be easily formed by cold forming member 62 as shown by the dotted lines, after insertion of the septum, into its final shape as shown by the solid lines. The aperture pair 63 and 64 permit passage of the needle through the septum with a degree of resistance which is dependent upon the degree to which support member 62 is cold rolled (hence the compression of the septum 60). Preferably, as shown in FIG. 3, the upper seal support member portion 61 is bi-metallic, the upper portion 61a being formed of cold rolled steel, a conventional metal which is easily soldered, or welded to, and which thereby forms the positive terminal of the battery. Sandwich portions 61b and 62 are preferably of a metal which is inert and non-corrosive in the atmosphere of the electrolyte (compatible). In the case of $SO_2$ as an electrolyte, such a metal would be high purity aluminum. The upper seal support member portion 61 may be formed by a clad bond between the cold rolled steel and the aluminum, formed in the conventional manner. FIG. 3a shows a variant at the seal support member periphery wherein even greater corrosive resistance is imparted by forming the bimetallic portion with the non-corrodable metal 61b' so that all possibility of corrosion at this extremity is eliminated.

While the principles of the invention have been described in connection with specific apparatus, it is to be clearly understood that this description is made only by way of example and not as a limitation to the scope of the invention.

What is claimed is:

1. In a pressurized hermetically sealed electrochemical cell including an electrode assembly of at least two opposite polarity electrodes and an electrolyte within a metal casing closed at one end, the improvement for facilitating the filling of said cell under hermetic conditions comprising:
   a member hermetically sealing the other end of said casing, said member comprising an apertured seal support member;
   an elastomeric septum in compression within said aperture for hermetically receiving a filling needle therethrough and thereafter, upon withdrawal of said needle, hermetically sealing said cell; and
   a catheter in opposed relation to said ridge within said hermetically sealed casing for piercing a closed end filling needle inserted through said slit.

2. The improvement claimed in claim 1, wherein said elastomeric septum includes a depending ridge containing a linear slit therethrough for accepting said filling needle whereby pressure in the cell acts upon said ridge to maintain hermetic seal closure.

3. In a pressurized hermetically sealed electrochemical cell including an electrode assembly of at least two opposite polarity electrodes and an electrolyte within a metal casing closed at one end, the improvement for facilitating the filling of said cell under hermetic conditions comprising:
   a seal support member hermetically sealing the other end of said casing comprising a bimetallic plate having a centrally disposed recessed aperture, and a second metal plate having an opposed centrally disposed recessed aperture, said elastomeric septum being in compression within said recesses, the portions of said seal support member contiguous to said apertures being formed of an electrolyte compatible metal; and
   an elastomeric septum in compression within said aperture for hermetically receiving a filling needle therethrough and thereafter, upon withdrawal of said needle, hermetically sealing said cell.

4. The improvement claimed in claim 3, wherein the electrolyte compatible portion of the bimetallic plate is larger in circumferential dimension than the second metal member making up said bimetallic plate, said excess of the circumferential dimension being folded over said second metal member.

5. The improvement claimed in claim 4, wherein said second metal is cold rolled steel.

6. The improvement claimed in claim 3, wherein the electrolyte is $SO_2$ and wherein the electrolyte compatible metal is high purity aluminum.

References Cited

UNITED STATES PATENTS

| | | | |
|---|---|---|---|
| 3,410,323 | 11/1968 | Richard et al. | 136—162 |
| 2,516,084 | 7/1950 | Wells | 136—178 |
| 2,239,988 | 4/1941 | Brennan et al. | 136—178 |
| 2,755,329 | 7/1956 | Barrett | 136—133 |
| 3,723,184 | 3/1973 | Stark et al. | 136—133 |

DONALD L. WALTON, Primary Examiner

U.S. Cl. X.R.

136—178